(12) United States Patent
Chieh et al.

(10) Patent No.: US 7,102,300 B2
(45) Date of Patent: Sep. 5, 2006

(54) BALLAST DEVICE WITH BUILT-IN POWER SUPPLY AND OPERATION THEREOF

(75) Inventors: Pi-Yao Chieh, Taichung Hsien (TW); Chang-Feng Wang, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 5 days.

(21) Appl. No.: 10/825,136

(22) Filed: Apr. 16, 2004

(65) Prior Publication Data

US 2005/0231130 A1 Oct. 20, 2005

(30) Foreign Application Priority Data

Jan. 28, 2004 (TW) .............................. 93101883 A

(51) Int. Cl.
*G05F 1/00* (2006.01)
(52) U.S. Cl. ...................... 315/291; 315/307; 315/247; 315/276
(58) Field of Classification Search ................ None
See application file for complete search history.

(56) References Cited

U.S. PATENT DOCUMENTS 6,642,674 B1 * 11/2003 Liao et al. ................. 315/291
6,812,916 B1 * 11/2004 Hwang ....................... 345/102
2003/0076053 A1 * 4/2003 Kambara et al. ........... 315/224
2006/0055341 A1 * 3/2006 Watanabe et al. ........... 315/291

* cited by examiner

*Primary Examiner*—Tuyet Thi Vo
(74) *Attorney, Agent, or Firm*—Troxell Law Office, PLLC

(57) ABSTRACT

A ballast device having active ballasting circuit and method thereof, which are used for controlling a HID lamp's power supply real-timely and steadily, comprising: a power supply unit in said ballast device for generating an outer working voltage, which has a DC-DC transformer to step down the output voltage; a micro control unit, which fetches the parameters of the ballast device other than itself or the HID lamp's various working status and generates a predefined load current by these parameters; a PWM control unit, which has a PID control module, the PID control module calculates said predefined load current and the HID lamp's practical load current, and makes said DC-DC transformer change it's output voltage by the calculate results. The present invention has a simple structure and can change the load current real-timely and steadily.

26 Claims, 5 Drawing Sheets

US 7,102,300 B2

BALLAST DEVICE WITH BUILT-IN POWER SUPPLY AND OPERATION THEREOF

TECHNICAL FIELD

The present invention relates to a ballast device and an operation method of the ballast device, and especially to a ballast device having a built-in a power supply unit and a micro control unit based circuit.

DESCRIPTION OF RELATED ARTS

Presently, most light sources for projectors are HID (High Intensity Discharge) device. To avoid damaging caused by an unsteady power source or an improper manipulation, the projector must have a steady power control device. The existent power control device 1' of a HID lamp as shown in FIG. 1, comprises a power supply 10' and a ballast 20'. The power supply 10' and the ballast 20' are set, respectively, in assistant power circuits 115' and 220' separate from each other.

The operational mode of the existent power control device 1' of a HID lamp as shown in FIG. 1 is as follows: firstly, said power supply 10' is activated to receive an input electrical source (AC95V~230V) 100'. Then an EMI (Electro Magnetic Interference) Filter 105' built in said power supply 10' wipes off EMI. A PFC (Power Factor Correction) 110' transforms the AC input electrical source 100' into DC and divides it into two routes, and one of them inputs into the ballast 20', and is stepped down by a DC-DC transformer 200', and then converted into practical working voltage by a DC-AC transformer 205' to supply to the HID lamp 30'.

But what should be noticed is the ballast mode of said ballast 20'; it passively detects the lamp's practical current, and then controlling the current via the transfer function of a PWM (Pulse-Width Modulation) 215'. Further, circuit of the existing ballast is more complex due to an extra assistant power circuit 220' is needed for supplying a working voltage to the ballast 20'. Moreover, because the ballast 20' passively detects the lamp's practical current, it can't steadily control the power in a real time manner.

SUMMARY OF THE INVENTION

A main object of the present invention is to provide a ballast device having active ballasting circuit and method thereof, make a power supply embedded into a ballast, so the ballast's working power can be supplied by the power supply unit directly, and then incorporate the formerly two power circuits into one without adding any assistant power circuits like existing technology, so it can save cost and predigest the whole ballast system.

A subordinate object of the present invention is to provide a ballast device having active ballasting circuit and method thereof. It actively detects and ballasts the lamp's practical current by a MCU (Micro Control Unit) and thereby controls a HID lamp's start-up process steadily and real-timely.

Another subordinate object of the present invention is to provide a ballast device having active ballasting circuit and method thereof. It detects the working status of the ballast or the HID lamp via a MCU as its referring outer parameters and real-timely transforms the practical active current of the HID lamp.

In accordance with the present invention, said active ballasting device, which is used to steadily control a load module (such as a HID lamp)'s control power, comprising: a power supply unit, a micro control unit, some detection modules and a PWM control unit.

The power supply unit is used to receive an electrical source, comprising: an EMI Filter for filtering EMI in the electrical source, a DC-DC transformer for stepping down the voltage that inputted into the DC-DC transformer, a PFC for transiting said filter AC to DC and outputting to said assistant power circuit and said DC-DC transformer respectively, and a DC-AC transformer.

Some detection modules are used to detect the working status of the ballast (except for the micro control unit) and/or the HID lamp as outer parameters for said MCU's reference. The MCU uses said outer working voltage directly, and generates said predefined load current according to said outer parameters.

The PWM control unit, which uses a PID control module to calculate said predefined load current and the load module's practical load current, and makes said DC-DC transformer change it's output voltage according to the calculate result, thereby transforms the load module's practical load current real-timely and steadily.

Besides above, an active ballasting method according to the present invention for steadily controlling a ballast device and the practical load current of the load module such as a HID lamp, comprises: activating power supply unit to receive an electrical source and generating outer working voltage by an assistant power circuit; stepping down the voltage that inputted into a DC-DC transformer by a power supply unit's DC-DC transformer; detecting the working status of the ballast device or the HID lamp as outer parameters for a MCU's reference; fetching said outer parameters to generate a predefined load current by the MCU which using said outer working voltage, and further judging whether the outer parameters are in the MCU's predefined range to determine to give an information that can be distinguished by user or not; calculating said predefined load current and said practical load current by a PID control module; and making said transformer change it's output voltage by the result of calculation; and then changing the load module's practical load active current steadily and real-timely.

The present invention has a simple structure, can save cost and simplify the whole system. The present invention also can change the practical load current steadily and real-timely.

Other objects, advantages and novel features of the invention will become more apparent from the following detailed description when taken in conjunction with the accompanying drawings.

DETAILED DESCRIPTION OF PREFERRED EMBODIMENT

Figure 1:
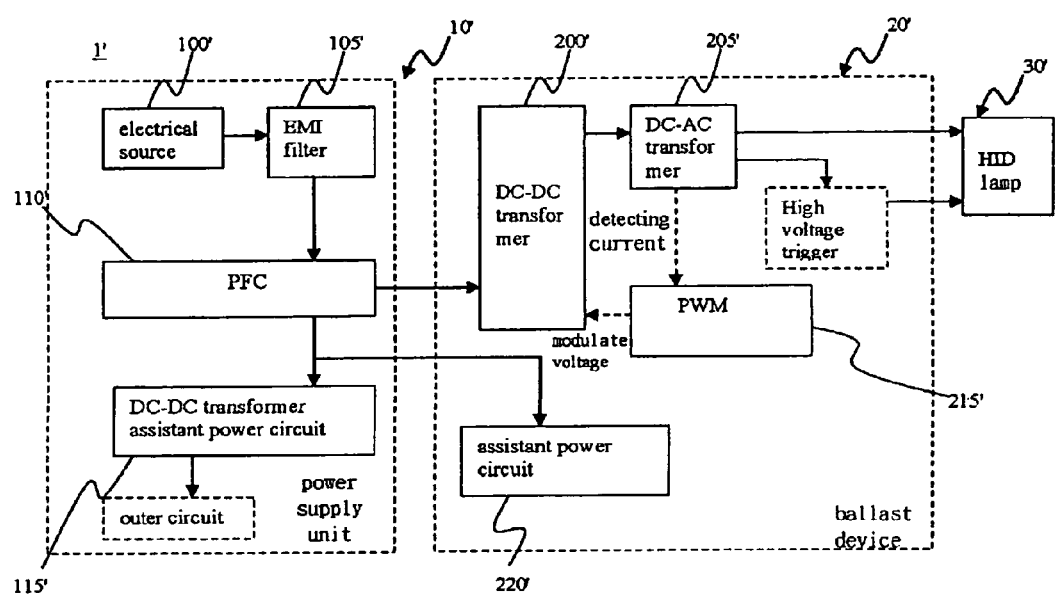
FIG. 1 is a sketch map of an existing HID lamp projector's power control device.
Figure 2:
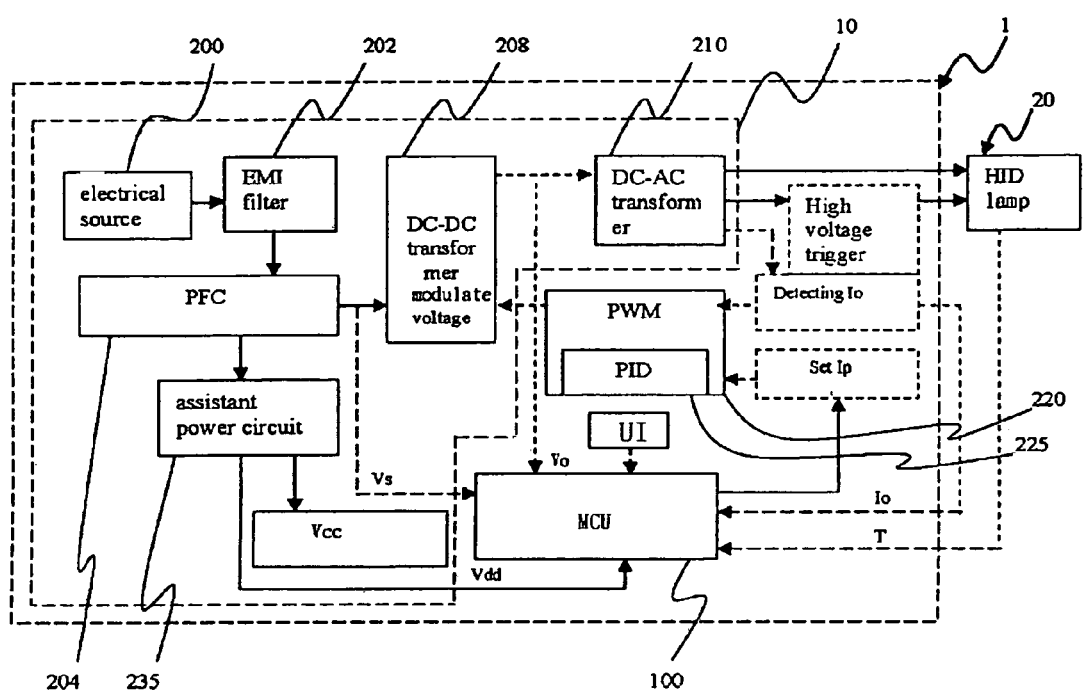
FIG. 2 is a sketch map of a ballast device according to the present invention's preferred embodiment.

Referring to FIG. 2, a ballast device 1 according to the present invention's preferred embodiment for steadily controlling a load module's (e.g. a HID lamp 20) control power, comprises a power supply unit 10, a MCU 100, some detection modules (not shown) and a PWM control unit.

Said power supply unit 10 receives an electrical source 200 when the power switch is activated, said power supply unit 10 comprising: an EMI Filter 202 for filtering EMI, an assistant power circuit 235 for generating an outer working voltage $V_{dd}$ as the working power of the MCU 100 and for generating an interior working voltage $V_{cc}$ as the power supply of the rest units, a PFC 204 for transforming the AC power sent by the filter 202 to DC power, dividing it into two routes, and outputting them into said assistant power circuit 235 and said DC-DC transformer 208 respectively, a DC-DC transformer for stepping down the voltage which is inputted the DC-DC transformer and transforming it into the output voltage $V_o$, a DC-AC transformer 210 for electric connecting with said MCU 100 and inverting DC power to AC power.

The detection units each comprise some specifically resistant and operational amplifiers, which is set nearby the PFC 204, the DC-DC transformer 208 and the HID lamp 20, and electric connects with said MCU 100 for detecting working status, such as said PFC 204's output voltage VS, said DC-DC transformer 208's output voltage $V_o$, the HID lamp 20's temperature T or the practical load current $I_o$ as the outer parameters of said MCU 100.

The MCU 100 directly uses said outer working voltage and generates a predefined load current $I_p$ according to outer parameters such as the HID lamp's practical load current $I_o$. Moreover, the MCU 100 can further judge whether every received or fetched outer parameter is in a predefined range set in the MCU to determine whether to generate information (e.g. alarm information) that can be distinguished by user or whether to start control circuit. Further more, a UI may be set in said ballast device 1 for predefining said outer parameters (e.g. the HID lamp's 20 predefined load current $I_p$) by a user or the MCU 100. In a preferred embodiment of the present invention, the MCU 100 may choose ANALOG's ADUC812.

The PWM 220 has a PID control module 225 which can calculate said load current $I_p$, the HID lamp's 20 practical load current $I_o$, and an error value between above said two currents and can make said DC-DC transformer 208 properly adjust its output voltage $V_o$, then adjust the HID lamp's practical load current $I_o$, steadily in a real-time manner.

Therefore, an active ballasting device 1 according to the present invention embodies a power supply 10, which can directly supply the working power the ballast device needed, so it can save a working power circuit module that the existing technique requires. Secondly, the ballast device 1 according to the present invention has a MCU 100, so that it can predefine the HID lamp's 20 predefined load start-up current $I_p$ by a program, and at the same time it can detect the HID lamp's practical load current, and then the PID control module 225 calculates said current, so as to effect real-time and active control of the HID lamp 20's practical load start-up current $I_o$.

Referring to FIG. 2, the active ballasting method for steadily controlling the control circuit between the control ballast 10 and a load module (e.g. the HID lamp 20) according to the present invention comprises the following steps:

Firstly, activating the power switch to make the power supply unit 10 receive an electrical source 200, and filtering (comprising bridge rectification) EMI by an EMI filter 202. Secondly, transforming AC voltage to DC voltage by a PFC and supplying the DC voltage through two output routes, wherein one of them acts as an input voltage of the assistant power circuit 235, and another is inputted into the DC-DC transformer and be stepped down as the output voltage $V_o$. The voltage that is inputted into the assistant power circuit 235 will be separated into two routes to output, and they are the assistant power $V_{dd}$ and $V_{cc}$, $V_{cc}$ acting as the assistant power's main output namely power supply, and $V_{dd}$ acting as the working power of other elements, such as the MCU 10. Further, the DC-AC transformer 210 converts said output DC voltage VO to AC whose frequency is 400 Hz acting as the HID 20's practical load voltage.

After the power is activated, the PID control module 225 calculates the output predefined load current $I_p$ of the MCU 100 and the HID lamp 20's practical load current $I_o$ that detected by said detection module. The DC-DC transformer 208 properly adjusts the output voltage $V_o$ according to the result, thereby adjusts the HID lamp 20's practical load current $I_o$, in accordance with the practical load current $I_o$, the MCU 100 can trace the predefined load current $I_p$ in a real-time manner, and in this way the intent of limiting the start-up current is achieved.

Figure 3:
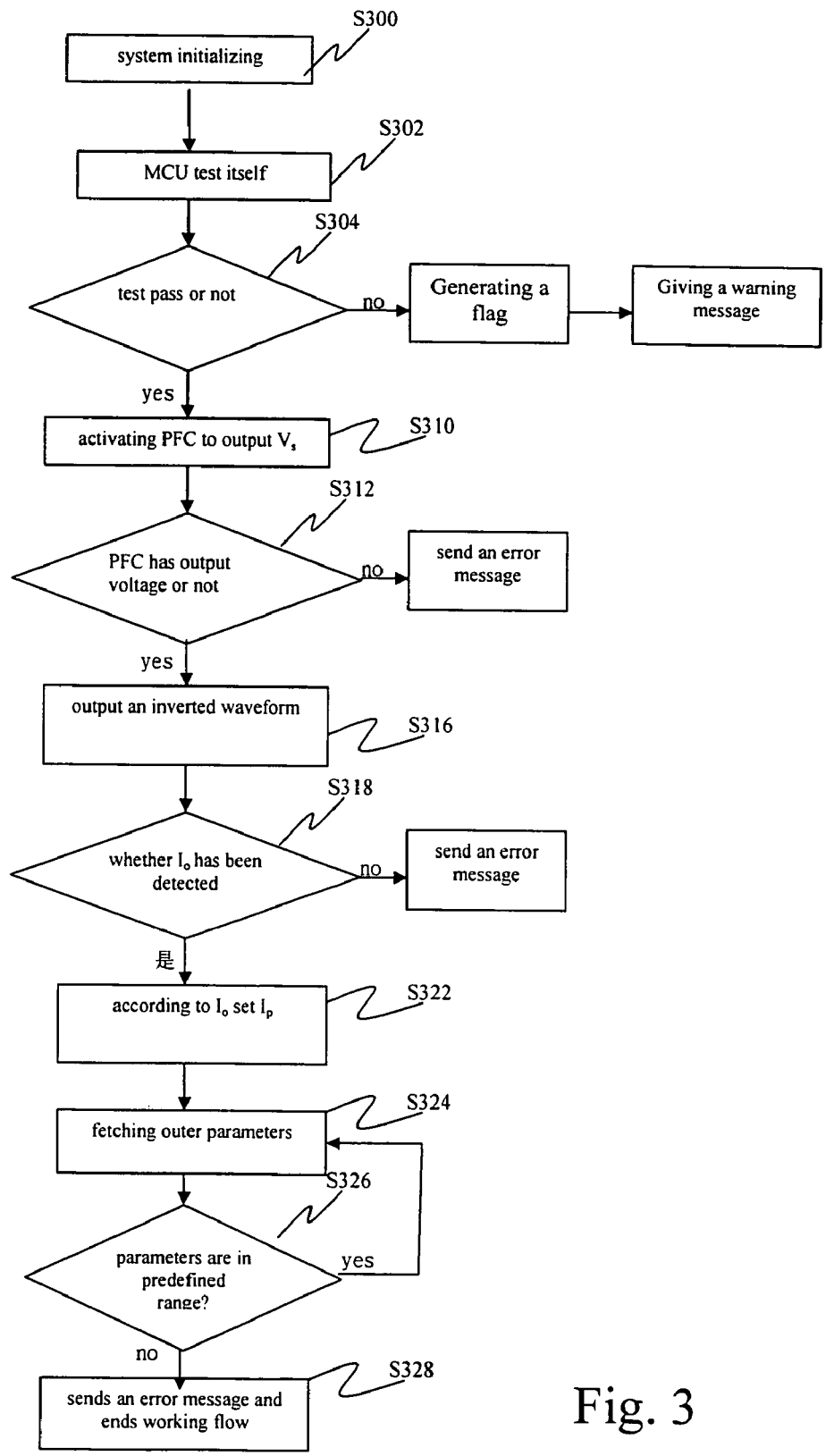
FIG. 3 is a working flow chart of a ballast device's MCU according to the present invention's preferred embodiment.
Figure 4:
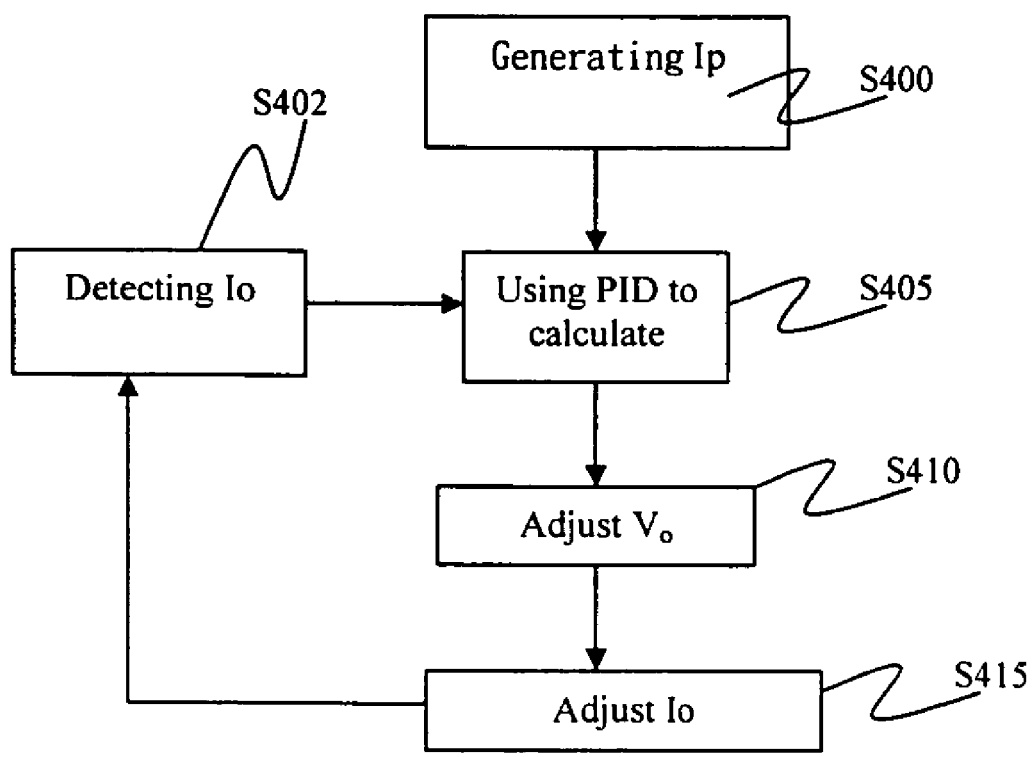
FIG. 4 is a flow chart of a ballast device steadily controlling a HID lamp's practical load current according to the present invention's preferred embodiment.
Figure 5:
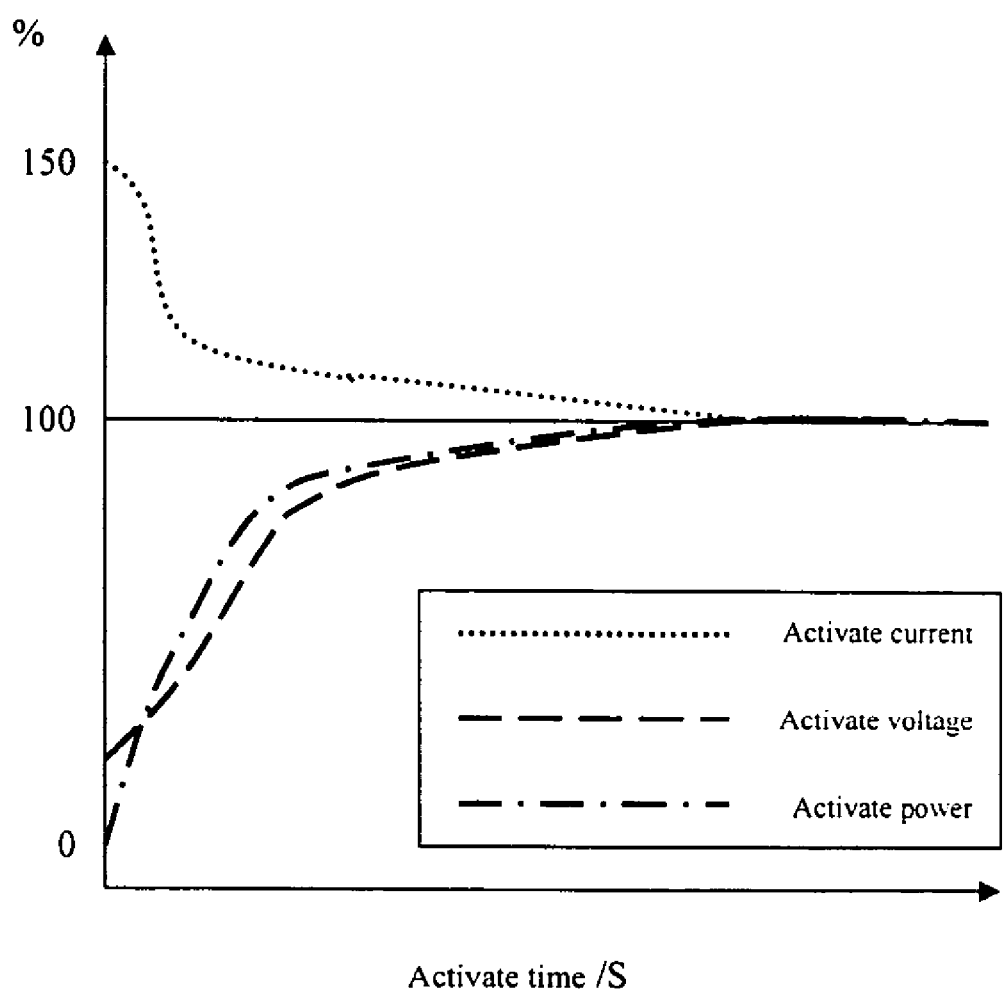
FIG. 5 is an active characteristic graph of a HID lamp according to the present invention's preferred embodiment.

The detailed working flow about said MCU 100 can further refer to FIG. 3, and comprises:

Process S300 and S302, when the whole system is initializing, the MCU 100 tests itself;

Process S304, judging said test pass or not, and if not generating a flag in a buffer storage and giving a warning message to notice user;

Process S310, activating the PFC 204 to output voltage $V_s$;

Process S312, judging whether the PFC 204 has output voltage, that is to say judging whether the PFC 204 is in working order; if not, the MCU 100 sends an error message and ends the whole working flow;

Process S316, the MCU 100 outputs an inverted waveform to control the DC-AC transformer 210 to transform Vo into AC voltage and supply to the HID lamp 20;

Process S318, judging whether the HID lamp 20's practical load current $I_o$ has been detected, that is to say judging whether the HID lamp 20 is in working order, if not, the MCU 100 sends an error message and ends the whole working flow;

Process S322, according to the detected HID lamp 20's practical load current $I_o$, the MCU 100 outputs the predefined load current $I_p$;

Process S324, fetching various outer parameters which the detection module has detected, such as activating the PFC 204 for outputting the voltage $V_s$, the DC-DC transformer's outputting voltage $V_o$, the HID lamp's temperature T and the practical load current $I_o$; and Process S326, judging whether said outer parameters are in the predefined range; if not, in process S328, the MCU 100 sends an error message and ends the whole working flow;

Referring to FIG. 4, it is a flow chart of a ballast device steadily controlling a HID lamp's practical load current according to the present invention's preferred embodiment, the process comprising:

Process S400, S402 and S405, using the PID control module to calculate with said MCU 100's output predefined load current $I_p$ and the HID lamp 20's practical load current $I_o$;

Process S410, making the DC-DC transformer 208 properly adjust its output voltage $V_o$ according to said calculate result;

Process S415, because the adjustment of output voltage $V_o$, we can adjust the load module's practical load active current in a real time manner; and Process S415, detecting the practical load current $I_o$ of the HID lamp 20 again, and outputting the predefined load current $I_p$ according to the detected practical load current by the MCU 100, such in cycles, till achieving the aim of steadily controlling the active current $I_o$. Referring to FIG. 5, FIG. 5 is an active characteristic graph of a HID lamp according to the present invention's preferred embodiment. It can be found that: at the beginning of the HID lamp 20's startup, the HID lamp 20's practical load active current is 150% or so of the normal current, conversely the voltage and power are only 20%–40% of the normal value. But after the HID lamp 20's current is steadily controlled, the practical load current will gradually decline, however the voltage and power will gradually rise. It needs 1.5 min or so, the voltage and power arrive the normal value and stop rising. In this way, the present invention can protect the HID lamp 20 and the circuits in the ballast device efficiently.

From above it is to be understood, the ballast device according to the present invention controls all power circuits with the MCU 100; comprising:

1. Outputting an invert waveform, namely inverting DC power to AC power by the DC-AC transformer 210.

2. Fetching the HID lamp 20's practical load current Io, the detection module collects the output current Io's voltage and inputs it to the MCU 100.

3. Fetching the DC-DC transformer 208's output voltage Vo, which is collected and inputted to the MCU 100 by the detection module.

4. Fetching the PFC 204's output voltage Vs, which is collected and inputted to the MCU 100 by the detection module.

5. Controlling the HID lamp's load startup current steadily. Because the MCU 100 has a D/A CONV, we can predefine load startup current and make the practical load current and predefined load current voltage equal by the PID control module's character, so we can change output voltage by the DC-DC transformer 208 to achieve the intent of changing output current.

Sum up of the above, the ballast device having active ballasting circuit and the method of the present invention have a power supply unit directly supplies the working power that the ballast needed, so it can simplify the whole system and saves cost. Secondly, the present invention uses a MCU to fetch various working status as its outer parameters for active ballasting, so it can control a HID lamp start-up process steadily and real-timely.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A ballast device adapted to receive an external voltage from an electrical source and supply a stable power to a load module, the ballast device comprising:
   a power supply unit that comprises an assistant power circuit receiving the external voltage and generating an outer working voltage, and a transformer module converting the external voltage into an output voltage applied to the load module and inducing an actual load current flowing through the load module;
   a micro control unit, which receives the outer working voltage and generates a predefined load current; and
   a PWM control unit, which comprises a PID control module that receives and operates on the predefined load current and the actual load current and, in response thereto, generates a control signal to the transformer module to modulate the output voltage.

2. The ballast device as claimed in claim 1, further comprising a user interface, which allows for user setting of the predefined load current.

3. The ballast device as claimed in claim 1, wherein the power supply unit comprises an EMI filter for filtering out EMI from the external voltage and providing a filtered voltage; a PFC receiving the filtered voltage and in response thereto generating a direct current output, which is applied to the assistant power circuit to be converted into the outer working voltage and the transformer module to be converted into the output voltage separately.

4. The ballast device as claimed in claim 1, wherein the assistant power circuit generates an interior working voltage to power the ballast device.

5. The ballast device as claimed in claim 1, wherein the transformer module comprises a step-down DC-DC transformer.

6. The ballast device as claimed in claim 5, further comprising a DC-AC transformer, which receives a DC output from the DC-DC step-down transformer and generates the output voltage and the actual load current to the load module.

7. The ballast device as claimed in claim 1, further comprising a detection module detecting an operation parameter of the ballast device, and providing the operation parameter to the micro control unit for controlling the operation of the ballast device.

8. The ballast device as claimed in claim 7, wherein the micro control unit receives the operation parameter, and in response thereto generates the predefined load current.

9. The ballast device as claimed in claim 7, wherein the micro control unit receives the operation parameter and in response thereto generates a user-identifiable message.

10. The ballast device as claimed in claim 7, wherein the operation parameter is selected from a group consisting of temperature of the load module, the output voltage of the transformer module and an output of a PFC of the power supply unit that is supplied to the assistant power circuit and the transformer module.

11. A method for supplying a stable power to a load module, comprising the following steps:
    activating a power supply unit to receive an external voltage from an electrical source, and generating an output voltage applicable to the load module;
    detecting an practical load current flowing through the load module induced by the output voltage;
    providing a predefined load current by a micro control unit;
    processing said predefined load current and said practical load current with a PID control module to generate a control signal; and
    modulating the output voltage with the control signal.

12. The method as claimed in claim 11, wherein the output voltage is generated by down converting a first DC voltage, which is provided by the power supply unit, into a second DC voltage by a DC-DC transformer.

13. The method as claimed in claim 11, wherein the step of providing a predefined load current comprises providing a user interface and user setting the predefined load current in the micro control unit.

14. The method as claimed in claim 11, further comprising a step of generating an interior working voltage by an assistant power circuit of said power supply unit.

15. The method as claimed in claim 11, wherein said power supply unit comprises an EMI Filter for filtering EMI from the external voltage and providing a filtered voltage; a PFC for converting the filtered voltage to a first DC voltage and separately supplying said first DC voltage to an assistant power circuit that generates an outer working voltage powering the micro control unit and a DC-DC transformer that converts the first DC voltage to a second DC voltage for further inducing the output voltage.

16. The method as claimed in claim 15, further comprising a step of generating an inverter wave by said micro control unit to control a DC-AC transformer that converts the second DC voltage to the output voltage.

17. The method as claimed in claim 15, further comprising a step of defining one operation parameter and supplying the operation parameter to the micro control unit to generate the predefined load current.

18. The method as claimed in claim 17, further comprising a step of judging whether the operation parameter is with a preset range to determine whether to generate an identifiable message.

19. The ballast method as claimed in claim 17, wherein the operation parameter is selected from a group consisting of temperature of the load module, an output voltage of said DC-DC voltage transformer and an output voltage of said PFC.

20. A method for employing a ballast device having built-in power supply unit to supply a stable power to a load module, comprising the following steps:
supplying an external voltage from an electrical source to the power supply unit to generate an outer working voltage, which is supplied to a micro control unit, and an output voltage, which is applicable to the load module to induce an actual load current flowing through the load module;
detecting an operation parameter of at least one of the power supply unit and the load module;
applying the operation parameter to the micro control unit to generate a predefined load current;
performing a PID operation on the predefined load current and the actual load current to obtain a control signal; and
modulating the actual load current with the control signal in a real-time manner.

21. The method as claimed in claim 20, further comprising a step of generating an invert wave by the micro control unit to control conversion of an intermediate DC voltage in the power supply unit into an AC to serve as the output voltage supplied to the load module.

22. The method as claimed in claim 20, further comprising a step of using an EMI Filter to filter out EMI inform the external voltage from the electrical source; a step of using a PFC to convert a filtered voltage generated by said the EMI filter into a first DC voltage; a step of using an assistant power circuit to receive the first DC voltage and generate the outer working voltage; and a step of using a DC-DC transformer to receive and convert the first DC voltage into a second DC voltage based on which the output voltage is generated, the DC-DC transformer receiving the control signal to control the second DC voltage in order to modulate the actual load current.

23. The method as claimed in claim 22, wherein the operation is selected from a group consisting of temperature of the load module, the second DC voltage generated by the DC-DC transformer, and the first DC voltage generated by the PFC.

24. The method as claimed in claim 23, wherein the step of applying the operation parameter to the micro control unit to generate the predefined load current further comprises simultaneously applying the actual load current to the micro control unit for generating the predefined load current.

25. The method as claimed in claim 24, further comprising a step of judging whether the operation parameter is within a preset range to device whether to generate an identifiable message.

26. The method as claimed in claim 25, further comprising a step of judging whether the operation parameter is within a preset range to decide whether to modify operation status of the ballast device.

* * * * *